United States Patent [19]
Allen et al.

[11] Patent Number: 5,617,153
[45] Date of Patent: Apr. 1, 1997

[54] EYEGLASS LENS SHIELD HAVING PERIPHERAL BAND

[76] Inventors: Lawrence L. Allen; Thomas E. Wilkins, both of P.O. Box 1165, Thomaston, Ga. 30286

[21] Appl. No.: 598,341

[22] Filed: Feb. 8, 1996

[51] Int. Cl.⁶ .............................. G02C 7/16; G02C 7/10; G02C 9/00
[52] U.S. Cl. .................. 351/45; 351/44; 351/46; 351/47
[58] Field of Search .................. 351/45, 46, 41, 351/158, 44

[56] References Cited

U.S. PATENT DOCUMENTS

| | | |
|---|---|---|
| 2,511,329 | 6/1950 | Craig . |
| 2,759,394 | 8/1956 | Evans . |
| 2,901,752 | 9/1959 | Granger . |
| 3,236,579 | 2/1966 | Evans . |
| 3,628,854 | 12/1971 | Jampolsky ............................ 351/45 |
| 5,266,977 | 11/1993 | Linden . |

*Primary Examiner*—Hung X. Dang
*Attorney, Agent, or Firm*—Rodgers & Rodgers

[57] ABSTRACT

A lens shield overlying the outer surface of an eyeglass lens comprising a thin sheet of polymer material with the molecular structure of the periphery of the lens shield corresponding to the molecular structure of the eyeglass lens.

3 Claims, 1 Drawing Sheet

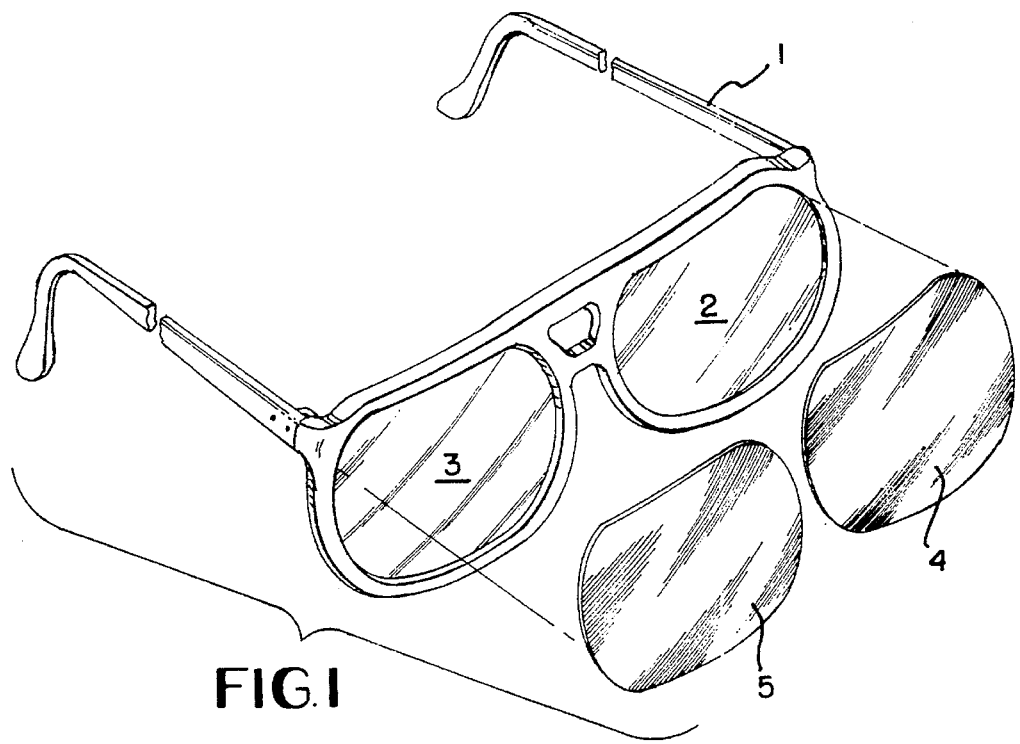
FIG.1
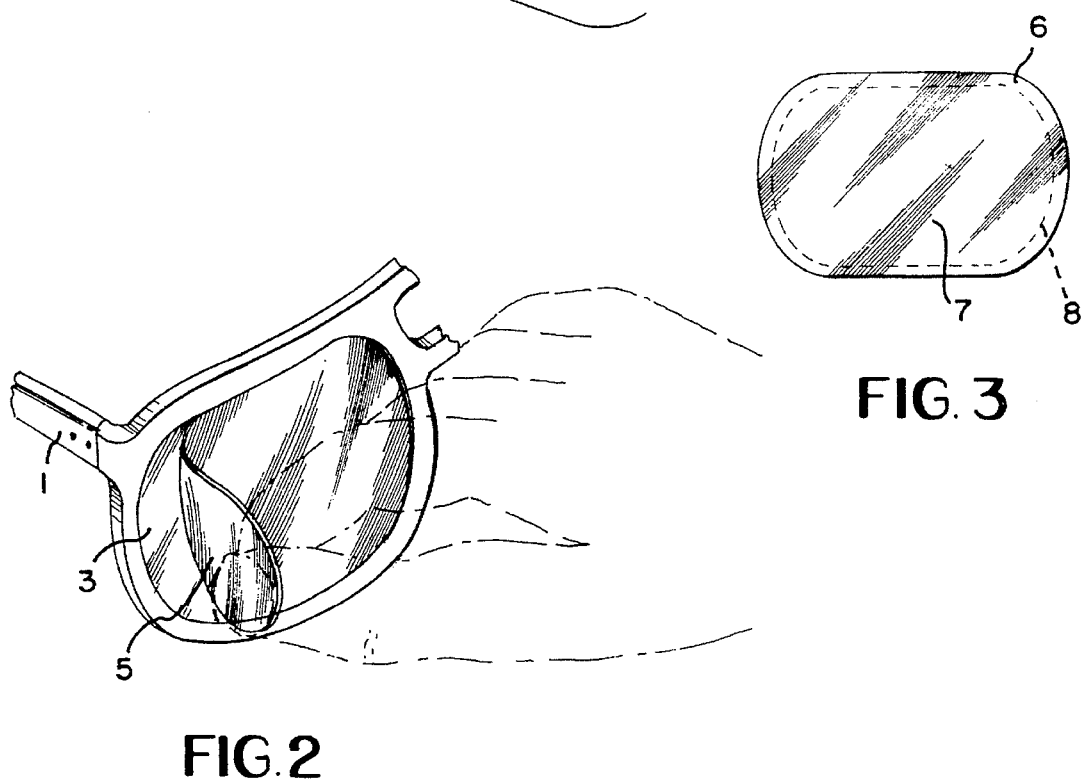
FIG.3
FIG.2

EYEGLASS LENS SHIELD HAVING PERIPHERAL BAND

BACKGROUND OF THE INVENTION

The purpose of this invention is to provide a convenient and simplified means for converting conventional prescription eyeglasses into sunglasses. It is well known to apply tinted material to the outer surface of an eyeglass lens in order to provide glare reduction and protection from the effects of the sun.

Various methods of attaching sun protection material to an eyeglass lens are known such as, for example, by means of adhesives, vacuum, clips, and the like. Once the material is in place on the lens, it typically becomes very difficult to easily and quickly remove it in order to return the lens to an unprotected condition.

SUMMARY OF THE INVENTION

A lens shield for a conventional eyeglass lens comprises a thin sheet of flexible material overlying the outer surface of an eyeglass lens with the inner portion of the lens shield having a molecular structure different from the eyeglass lens and the periphery of the lens shield having a molecular structure corresponding to that of the eyeglass lens.

BRIEF DESCRIPTION OF THE DRAWING

In the drawing,

FIG. 1 is a perspective exploded view showing the lens shields, according to this invention, in conjunction with a pair of conventional eyeglasses;

FIG. 2 is an enlarged perspective view showing a lens shield in the process of being removed; and FIG. 3 is a plan view depicting the details of the lens shield.

DESCRIPTION OF THE PREFERRED EMBODIMENT

In the drawing the numeral 1 designates a pair of conventional eyeglasses having clear glass prescription lenses 2 and 3. As best shown in FIG. 1, lens shields 4 and 5 are associated with eyeglass lenses 2 and 3, respectively.

Lens shields 4 and 5 comprise a tinted film of flexible polymer material for the purposes of reducing light transmission to one's eyes and filtering ultra-violet radiation thereby providing reduced glare from the sun and protection from ultra-violet radiation. Lens shields 4 and 5 are manufactured of a polymer material which will not alter the eyeglass prescription or appreciably affect the weight or center of gravity of the eyeglasses.

In use, lens shields 4 and 5 are positioned over the outer surfaces of eyeglass lenses 2 and 3, respectively, and simply manually pressed into position by means of the user's finger. Lens shields 4 and 5 are held in position by means of adhesion which is well known as the force that holds together the molecules of unlike substances whose surfaces are in contact. After use, lens shields 4 and 5 are manually removed, as best shown in FIG. 2. More specifically, the user slips a thumb nail under the edge of the respective lens shield allowing the lens shield to be entrapped between the thumb and forefinger thereby enabling it to be easily pulled away from the eyeglass lens.

Since the lens shield is made of a thin layer of polymer material, the natural adhesion force causes the lens shield to be held tightly in position against the outer surface of the associated eyeglass lens. It therefore becomes very difficult to remove the lens shield from the eyeglass lens due to the problem of not being able to conveniently slip a thumb nail under the edge of the lens shield without the aid of some type of shard object to initiate the removal process.

According to this invention, the periphery of the lens shield material is of a chemical composition such that the molecular structure thereof corresponds with that of the associated eyeglass lens while the inner surface of the lens shield maintains a molecular structure different from the eyeglass lens. This peripheral band 6 is approximately 5 mm in width and preferably extends around the entire periphery of the lens shield.

The junction between band 6 and inner portion 7 of lens shields 4 and 5 is indicated in FIG. 3 by means of dotted line 8. Since the molecular structure of band 6 corresponds to that of the associated eyeglass lens, band 6 essentially has plastic or glass characteristics to correspond to the characteristics of the eyeglass lens. Junction 8 between band 6 and inner portion 7 is achieved by known methods of chemical fusion. Although it is desirable for junction 8 to be imperceptible, sometimes the fusion process causes junction 8 to be visible. When this occurs, visual acuity is not affected since junction 8 is not within a user's normal visual range when looking through eyeglass lenses 2 and 3.

In summary, by this invention, a lens shield is provided which is held in position positively against the outer surface of an eyeglass lens but still allows the user to easily initiate the process of removal and then lift and grasp the lens shield and peel it away from the eyeglass lens. The lens shield can then be stored for later reuse or immediate disposal as desired.

We claim:

1. A lens shield for an eyeglass lens comprising, a thin sheet of flexible material substantially corresponding to the shape of said eyeglass lens, said sheet overlying said eyeglass lens and being held in place by means of natural adhesion, a band extending around the periphery of said lens shield, said band being chemically fused to said lens shield, and the molecular structure of said band corresponding to the molecular structure of said eyeglass lens.

2. A lens shield according to claim 1 wherein said material is tinted.

3. An lens shield according to claim 1 wherein said band is approximately 5 mm in width.

\* \* \* \* \*